March 18, 1969

A. TRUHAN 3,433,949

RADIANT ENERGY STABILITY TEST CHAMBER
HAVING AIR CIRCULATING MEANS

Filed Oct. 30, 1967

INVENTOR
ANDREW TRUHAN

BY *Stowell & Stowell*

ATTORNEYS

United States Patent Office 3,433,949
Patented Mar. 18, 1969

3,433,949
RADIANT ENERGY STABILITY TEST CHAMBER HAVING AIR CIRCULATING MEANS
Andrew Truhan, R.D. 3, Box 392T,
Somerset, N.J. 08873
Continuation-in-part of application Ser. No. 453,694, May 6, 1965. This application Oct. 30, 1967, Ser. No. 678,867
U.S. Cl. 250—51
Int. Cl. G01n 21/06
2 Claims

ABSTRACT OF THE DISCLOSURE

A radiant energy stability test chamber provided with a uniform nonpoint source of radiant energy with means for directing a flow of air selectively about the radiant energy producing means, by passing the test chamber or through the test chamber or part through the chamber and part through the air by-pass passages.

---

This application is a continuation in part of my application Ser. No. 453,694 filed May 6, 1965, for Radiant Energy Stability Test Chamber, now abandoned.

This invention relates to an improved test chamber and is especially directed to a device adapted to test the effects and changes in drugs, chemicals, dyes, paints and other material when subjected to electromagnetic radiation such as, but not limited to, fluorescent light, incandescent light, ultra violet light and combinations thereof.

It is a particular object of the person's invention to provide a radiant energy stability test chamber wherein the material to be tested is substantially uniformly subjected to the source of radiant energy.

A further object is to provide such a device which may have a very high radiant energy source but wherein the temperature of the materials being subjected to the radiation remain substantially at ambient temperature.

A further object of the present invention is to provide such device wherein the radiant energy impinging upon the materials to be tested may be readily varied from substantially 100 percent of the output source to a low portion thereof.

A further object of the present invention is to provide an improved radiant energy stability test chamber wherein the test conditions may be readily duplicated in subsequent tests.

Other objects are to provide a device that is simple in construction and relatively inexpensive to manufacture and to operate.

These and other objects and advantages are provided in a radiant energy test stability chamber comprising a housing having top, bottom, side and end wall means; the bottom of the housing comprising a perforated air permeable wall extending between the side and end walls and separating said housing into a main chamber and an upper outlet plenum; an air passage in the top of the housing; fan means mounted in said plenum chamber and communicating with the air passage in the top of the housing; and a plurality of parallel elongated radiant energy producing means positioned immediately below said perforated wall; said radiant energy producing means being substantially coextensive with their corresponding parallel housing walls.

Other objects and advantages of the present invention will be more apparent to those skilled in the art from the following detailed description of the invention when considered in light of the accompanying drawings wherein.

Figure 1:
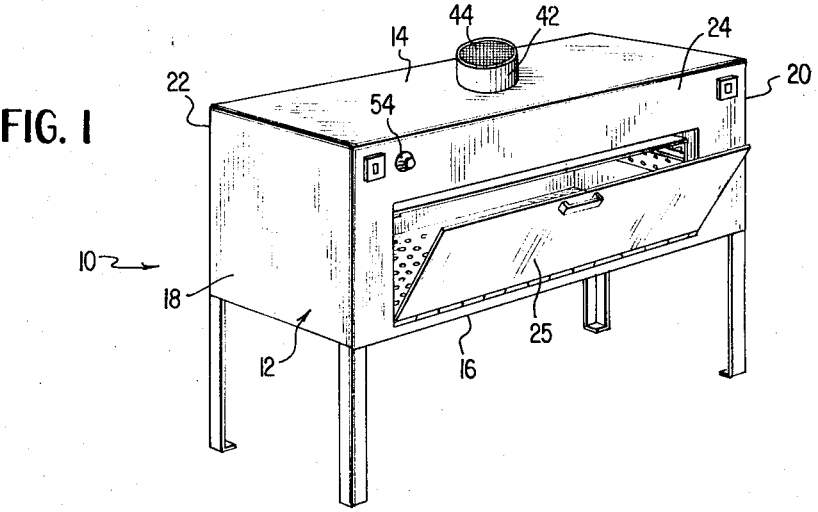
FIGURE 1 is a perspective view of a preferred form of the radiant energy stability test chamber.

Referring to the drawings 10 generally designates an improved radiant energy test stability chamber. The test stability chamber comprises a housing 12 having a top 14, a bottom 16, end walls 18 and 20 and sidewalls 22 and 24.

The bottom wall 16 of the housing consists of a perforated air permeable member extending between the endwalls 18 and 20 and the sidewalls 22 and 24. In the illustrated form of the invention the bottom wall consists of a pair of panels 26 and 28 having a plurality of openings 27–27' therethrough which panels are in spaced relationship and are provided with a filter member 30 therebetween. The upper and lower panels 26 and 28 may comprise commercial pressed or hardboard having openings approximately one-quarter inch in diameter spaced on for example one-half inch centers and the filter member 30 may comprise a bolt of fiber glass. The filter 30 may be replaced by removing the top perforate panel 28.

The housing is provided with a further perforated panel 32 having openings 34 therethrough which panel is mounted in spaced parallel relationship to the top 14 on brackets forming light sockets 36 which in turn are secured peripherally about the inner walls of the housing. The perforated panel 32 is mounted in parallel relationship to the top 14 and in space relationship thereto to provide a treating chamber 38 and a plenum chamber 40 within the housing.

The roof 14 of the housing is provided with a short cylindrical chimney 42 having a wire mesh top 44. Internally of the chimney 42 there is mounted a conventional exhaust fan 46 having an electric motor 48.

Mounted in sockets 36 immediately below the perforated panel 32 are a plurality of elongated parallel radiant energy producing means illustrated as light tubes 50. The conventional electrical sockets 36, are connected to a source of electric current through a rheostat the control means for which is illustrated at 54 and FIGURE 1 of the drawing. It will be particularly noted that the elongated radiant energy producing means 50 are substantially coextensive with the length of the sidewalls 22 and 24 and are closely spaced as more clearly illustrated in FIGURE 3 of the drawings. The electromagnetic wave energy producing means 50 may comprise fluorescent tubes, incandescent tubes, ultra-violet tubes or combinations thereof or other forms of electromagnetic wave producing means may be provided in the chamber. However, regardless of the type of electromagnetic radiation producing means it is essential that they extend substantially coextensive to the length and width of the housing so that materials to be treated and placed on the upper surface of the bottom 16 of the housing will receive substantially uniform radiation.

Where a single source of light is employed the intensity of the light varies with the square of the distance from the source, therefore if the light were positioned in the center of the cabinet material positioned toward one of the endwalls or one of the sidewalls would receive less radiation than material positioned directly below the light source, and non-uniform test results would be obtained. However, where the source of radiant energy is from an extended zone substantially coextensive with the interior cross sectional area of the housing substantially all areas of the bottom 16 will receive substantially equal amounts of electromagnetic wave energy.

The rheostat controlled by controller 54 is provided in the system so that when the chamber is initially put into operation, i.e., with brand new light tubes, the voltage supplied to the tubes is slightly reduced as it has been found that new fluorescent tubes have a higher foot candle output than bulbs that have been in operation for, for example, 20 to 60 hours. Therefore, as the light output of the tubes decreases with age the rheostat is adjusted to compensate for the inherent fall off in illuminosity due to age of the radiant energy producing means.

The front wall 24 of the chamber is provided with a large access door 25 which extends substantially the length of the interior sidewalls 23 and 25' and from the base to a point adjacent the elongated radiant energy producing means 50 whereby materials to be tested may be conveniently placed in the cabinet and the radiant energy producing elongated tube 50 may be readily replaced.

Between the interior surfaces of side walls 18 and 20 and the external surfaces of side walls 23 and 25' are air by-pass passages 60 and 62 respectively. By-pass passage 60 is connected to the ambient atmosphere via a plurality of openings 63 in the bottom panel 26 which openings cooperate with openings 65 in a slidably mounted panel 67. The panel 67 is connected to the under-surface of bottom wall 26 by pins 66 which are received in slots in the slide panel 67 or the bottom wall 30. A handle 68 may be connected to panel 67 to facilitate opening and closing of the air passages formed by cooperating openings 63 and 65. A similar arrangement is provided for the opposite side by-pass passage 62 as generally indicated at 69.

The upper portions of interior end walls 23 and 25' are provided with a plurality of air passages 80 which air passages cooperate with air passages 82 provided in slidably mounted air flow control panels 84 and 86 for end walls 23 and 25' respectively. Slidably mounted air flow control panels 84 and 86 may be mounted similarly to panel 67 described in reference to air by-pass passage 60.

The inner surfaces of side and end walls 22, 24, 23 and 25' are provided with mirrored reflective coatings or panels 53. The reflective surfaces insure uniform light conditions within the treating chamber. Where desired the wall surfaces comprising slides 84 and 86 may also have such mirrored surfaces.

Figure 2:
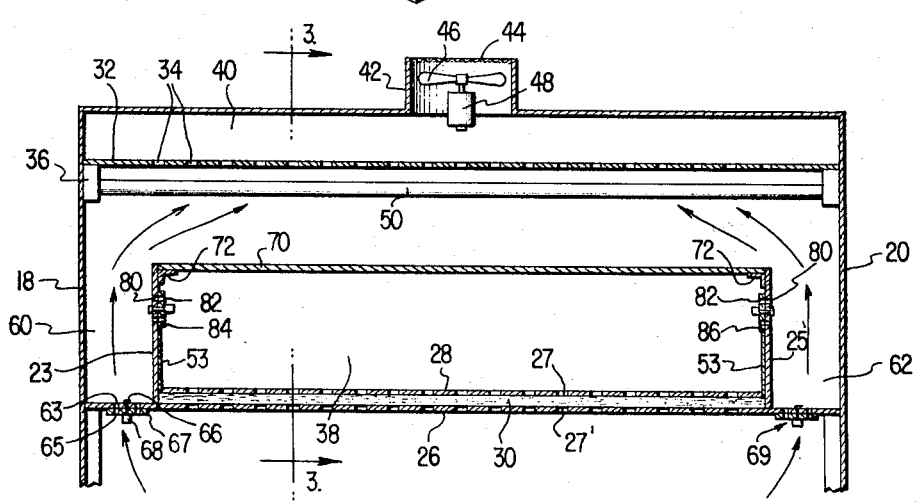
FIGURE 2 is a vertical sectional view through the device illustrated in FIGURE 1.
Figure 3:
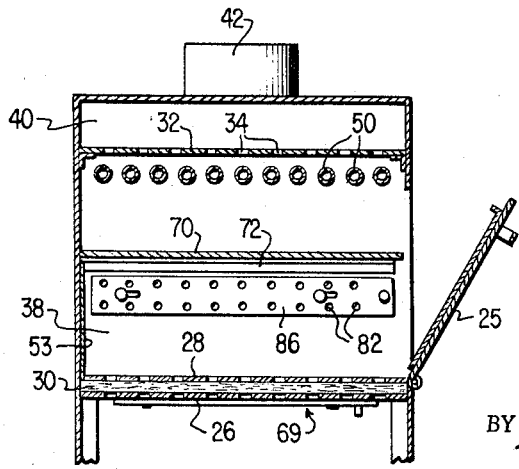
FIGURE 3 is a sectional view substantially on line 3—3 of the structure shown in FIGURE 2.

The housing may also be provided with removable radiant energy filter means. In FIGURES 2 and 3 a plate type filter 70 is illustrated as being supported on flanges 72 secured to interior end walls 23 and 25' of the housing. The use of filters substantially increases the utility of the radiant energy stability test chamber. For example, drugs or pharmaceuticals or other medicines may be tested for light deteriorations by placing samples thereof on the bottom 16 of the chamber. After a predetermined number of hours of exposure to radiant energy in the chamber the deterioration of the medicinals is determined. Thereafter another group of the same medicinals is placed on the bottom and a filter 70 having light filtration properties equivalent to a predetermined "brown medicine bottle" is placed in the chamber. The medicinals are then subjected to the radiant energy for the same period of time and the medicinals are then compared with the first sample exposed to the light without the filter in place.

In operation of the device with the light filter 70 mounted as illustrated in FIGURES 2 and 3 the motor 48 and fan 46 are energized to create a flow of air to provide cooling for the radiant energy producing means 50. With the light filter 70 in place, air flow created by the motor 48 and the fan 46 may be only through the openings 63 and 65 at the lower ends of air by-pass passages 60 and 62 about the radiant energy producing means 50, the upper perforated panel 32 and out the chimney 42. It will be noted that each of the air by-pass passages 60 and 62 terminated at their upper ends adjacent sockets 30 which provide the electrical energy for the radiant energy producing means 50, the zone of greatest heat protection. Where desired a portion of the cooling air system may be directed through the test chamber 38 by opening the slide plates 84 and 86. However generally, with the light filter 70 in place, cooling of the test chamber 38 is not necessary.

In operation of the device without the light filter 70 in place, air flow, in the by-pass passages 60 and 62 is generally cut off, so that all of the air exhausting from the chamber 40 passes through the test chamber 38, through the outlets 80 and 82 about the radiant energy producing means 50 and through the openings 34 in the panel 32. The foregoing air flow patterns maintain the samples to be subjected to the radiant energy at a relatively constant temperature and at the same time prevent the radiant energy producing tubes 50 from excessive heating. It is known that as the temperature of fluorescent or incandescent tubes vary the lumen output of the lights correspondingly vary. A meter reading is then obtained of lumen output adjacent the floor of the chamber. The rheostat 54 is adjusted to produce the desired quantity of radiation but preferably below maximum output so that as the light sources deteriorate through use a relatively constant lumen output at the floor may be maintained. The materials to be tested are then placed in the chamber, the door closed and the desired test conducted.

From the foregoing description of the preferred embodiment of the present invention it will be seen that the device fully accomplishes the aim and objects hereinabove set forth.

I claim:
1. A radiant energy stability test chamber comprising a housing having top, bottom, side and end wall means; the bottom comprising a perforated air permeable member extending between the side and end walls; support means maintaining the housing in an elevated horizontal position to permit air flow to and through the perforated bottom; a perforated air permeable wall extending between the side and end walls thereby separating the said housing into a main chamber and an upper outlet plenum chamber; air passage means in the top of the housing; fan means mounted in said plenum chamber and communicating with the air passage in the top of the housing; a plurality of parallel elongated radiant energy producing means being substantially coextensive with their corresponding parallel housing walls, to provide a zone of radiant energy coextensive with the main chamber, a radiant energy filter between the radiant energy producing means and the main chamber, and air by-pass passage means between the air permeable member and the plenum chamber and about the radiant energy filter.

2. The invention defined in claim 1 including flow control valve means for the by-pass passage means.

References Cited

UNITED STATES PATENTS

| 2,248,618 | 7/1941 | Fischer | 250—51 |
| 2,638,644 | 5/1953 | Rauhaut | 21—102 |

FOREIGN PATENTS

| 325,824 | 2/1930 | Great Britain. |

RALPH G. NILSON, *Primary Examiner.*

A. L. BIRCH, *Assistant Examiner.*

U.S. Cl. X.R.

250—86, 89